ELECTRIC THERMAL WINDOW WITH AN ADJUSTABLE TERMINAL STRUCTURE

Original Filed Sept. 14, 1970 2 Sheets-Sheet 1

INVENTORS
HANS DIETER PEETZ
HERMANN LURSSEN
BY
Bauer and Seymour
ATTORNEYS

ELECTRIC THERMAL WINDOW WITH AN ADJUSTABLE TERMINAL STRUCTURE

Original Filed Sept. 14, 1970 2 Sheets-Sheet 2

INVENTORS
HANS DIETER PEETZ
BY HERMANN LURSSEN
Bauer and Seymour
ATTORNEYS

United States Patent Office

Re. 28,295
Reissued Jan. 7, 1975

28,295

ELECTRIC THERMAL WINDOW WITH AN ADJUSTABLE TERMINAL STRUCTURE

Hans Dieter Peetz, Aachen, and Hermann Lurssen, Laurensberg, Germany, assignor to Saint Gobain Industries Original No. 3,634,654, dated Jan. 11, 1972, Ser. No. 72,132, Sept. 14, 1970, which is a continuation of abandoned application Ser. No. 666,795, Sept. 11, 1967. Application for reissue Apr. 8, 1974, Ser. No. 458,871
Claims priority, application France, Sept. 13, 1966, 76,151
Int. Cl. H05b *3/06*
U.S. Cl. 219—522 14 Claims

Matter enclosed in heavy brackets [ ] appears in the original patent but forms no part of this reissue specification; matter printed in italics indicates the additions made by reissue.

ABSTRACT OF THE DISCLOSURE

A thermal window having a glass pane, an electrical heating grid including bus bands affixed to the glass pane, and flat terminals having spaced portions fixedly attached to the bus bands at spaced points. The terminal intermediate the fixed points of attachment being free of attachment to the glass pane and the bus band and capable of easy change in dimension in response to external stimuli.

This application is a continuation of our application Ser. No. 666,795, filed Sept. 11, 1967, and now abandoned.

This invention relates to the construction of thermal windows (cf. French Pat. No. 1,464,585) and particularly to the assemblage of the pane, the heating grid, and the terminal. As the thermal window is useful in automobiles to prevent fogging, icing and other accumulations, the description will proceed with that structure in view as exemplary.

Thermal windows, of the type improved by this invention, have a glass pane which in automobiles is plain, triplex, or tempered, to one face of which a heating grid is attached as illustrated in FIG. 5. The grid may be resistance metal or resistance composition, may be in various forms either truly grid or so termed by courtesy, the shape, type, and method of attachment to the glass being part of the prior art unnecessary to be described here. In general, such windows have bus bands extending across opposite edges of the glass, between which extend the heating resistances.

Electrical terminals are very sensitive to the effects of changes in temperature, strong strains forming parallel to the glass because of their differences in coefficients of expansion, frequently detaching the terminal from the glass and sometimes cracking its outer surface, in either case making it useless.

We have discovered the cause of this imperfection and have corrected it by this invention. The invention involves a thermal window comprising a glass pane, a heating grid including a bus band affixed to the glass, and a terminal fixedly attached to the bus band and to the glass at spaced points, the terminal intermediate the fixed points of attachment being free, of attachment to the glass and the bus band, and capable of easy change in dimension in response to external stimuli.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a perspective view of a portion of a thermal window of the simplest form according to this invention;

Figure 1:
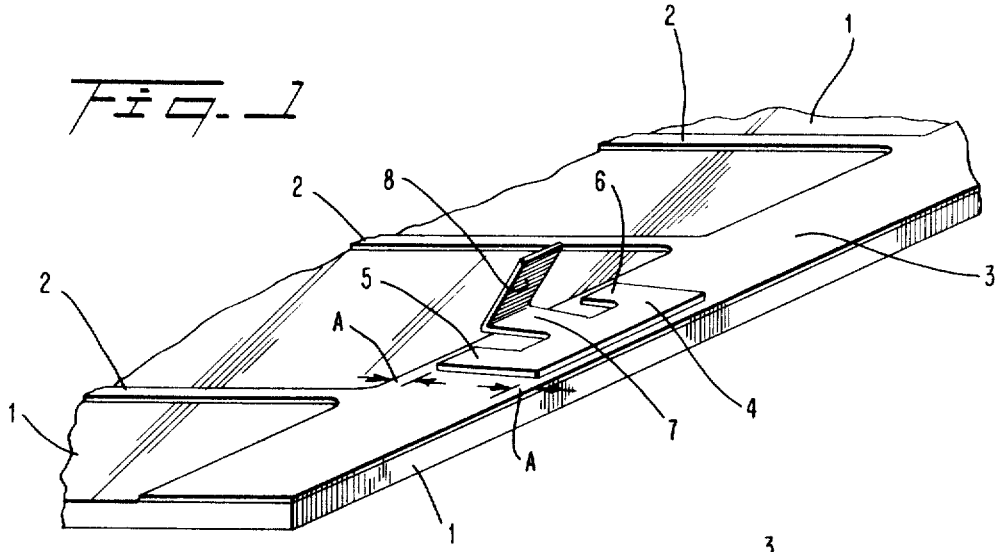

In FIG. 1 the window pane 1 bears an affixed heating grid 2–3 the bars 2 of which extend between bus bands 3, only one of which is shown. The bars and bands are of some known construction mounted on the pane by known methods. The electrical terminals are constructed of flat plates 5, 6, 7 shaped like the letter E, the central limb of which is extended at 8 to form a contact to which the contact of the lead will be attached, e.g. as in FIG. 4. In this novel construction the limbs 5, 6 are alone attached to the grid and the glass, the method of attachment being that used in the prior art, and the areas of attachment 11, 12 (FIG. 2) are small and are spaced apart. This leaves the length of the plate or strap portion of the terminal between 11, 12 free in the sense of being unattached to the glass, and the length of such portion is of small width, as provided by the spaces between the limbs of the E, which reduces the strength of the terminal and allows it to yield under the differing atmospheric conditions encountered in seasons and storms. We have also discovered that the total width of limbs 5 and 6 may advantageously be less than the width of the bus band by an amount A (FIG. 1). In a terminal of copper or brass of about 0.5 mm. thickness the distance A may be on the order of 0.5 to 1 mm.

Figure 3:
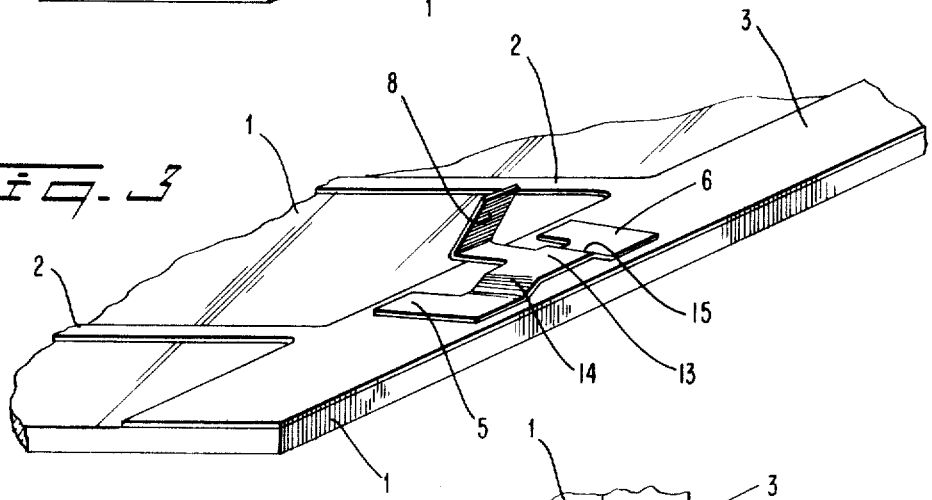
FIG. 3 is a perspective view of an improved form of the invention.

An advantageous form of the invention is illustrated in FIG. 3 wherein the central or strap part 13 of the terminal is offset at 14, 15 from the pane and the bus band, furnishing a readily deformable connection, between the points of attachment, capable of yielding readily to stresses imposed by temperature change or other conditions of operation.

Figure 2:
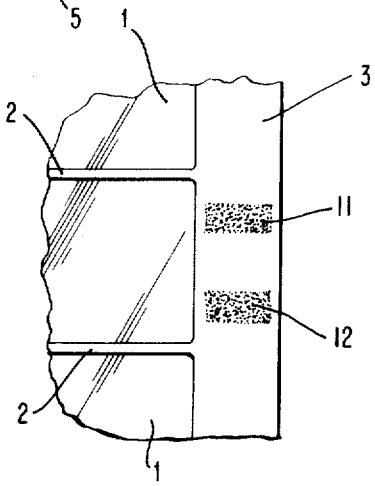
FIG. 2 is a plan view, partly in section, of the connection between the terminal and the grid and glass.
Figure 4:
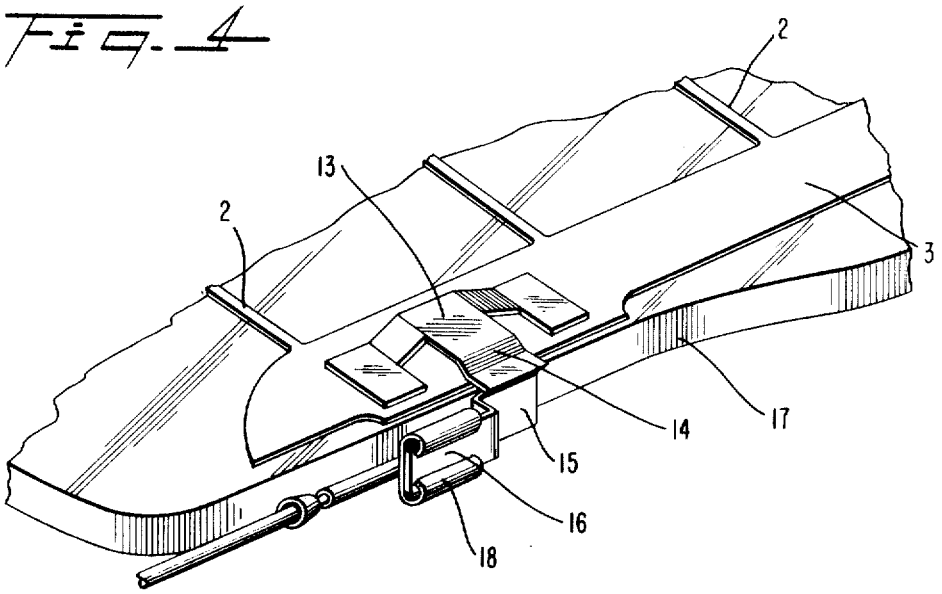
FIG. 4 is a perspective view of another form of the invention.
Figure 5:
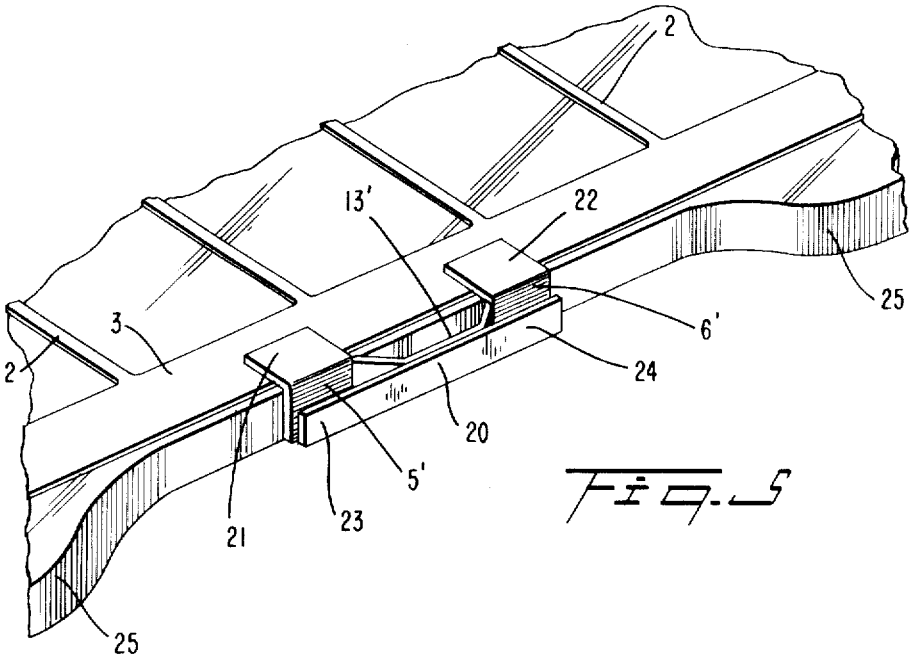
FIG. 5 is a perspective view of the preferred form of the invention.

The forms of FIGS. 1 to 3 have a projecting contact 8 which causes framing problems, but these have been overcome in FIGS. 4 and 5. In FIG. 4 the offset 13 is projected at 14 and 15 over and parallel to the edge of the pane, the part 15 being flush against but not attached to the pane and the contact 16 being displaced enough from the pane to seat the cooperating contact 18.

The preferred form of the invention shown in FIG. 3 has the plate 5', 6', 13' parallel to the edge of the pane, two tabs 21, 22 are bent over the edge of the pane and soldered to the bus band 3, and two contacts 23, 24 which are the ends of a single band attached at its middle to the offset strap 13'. This construction is recessed (25, 25) in the side of the pane so that all problems of framing are eliminated. A similar reduction at the end of the pane of FIG. 4 accomplishes a like result.

These new constructions yield readily to externally applied pressure, spare the connections and the pane, reduce the stresses caused by change in temperature and different rates of expansion, and eliminate the failures caused by prior constructions. The problems of framing, and elimination of projections capable of suffering shock are solved.

As many apparently widely different embodiments of the present invention may be made without departing from the spirit and scope thereof, it is to be understood that the invention is not limited to the specific embodiments.

What is claimed is:

1. A thermal window comprising a glass pane, a heating grid including a bus band affixed to the glass pane, and a terminal having spaced portions fixedly attached to the bus band at spaced points, the terminal intermediate the fixed points of attachment being free of attachment to the glass pane and the bus band and capable of easy change in dimension in response to external stimuli, said terminal having a strap portion attached to said spaced portions and an intermediate part which is offset from the spaced portions, the width of the bus band being greater than the width of the spaced portions of the terminal attached thereto, and in which the terminal lies parallel to the edge of the glass pane, is attached to the bus band by spaced arms and has a contact attached to the offset part of the strap portion extending parallel to the edge of the glass pane.

2. A thermal window comprising a glass pane, a heating grid including a bus band affixed to the glass pane, and a terminal having spaced portions fixedly attached to the bus band at spaced points, the terminal intermediate the fixed points of attachment being free of attachment to the glass pane and the bus band and capable of easy change in dimension in response to external stimuli, in which the terminal has a strap portion attached to said spaced portions thereof, and at least a part of the strap portion is offset and overlies and is parallel to the edge of the glass pane and is provided with a contact parallel to the edge of the glass pane.

3. A thermal window comprising a glass pane, a heating grid including a bus band affixed to the glass pane, and a terminal having spaced portion fixedly attached to the bus band at spaced point, the terminal intermediate the fixed points of attachment being free of attachment to the glass pane and the bus band and capable of easy change in dimension in response to external stimuli, the said glass pane having a recess in a portion of its outline, and the terminal is disposed in said recess.

4. A thermal window comprising a glass pane, a heating grid including a bus band affixed to the glass pane, and a terminal having spaced portions fixedly attached to the bus band at spaced points, the teminal intermediate the fixed points of attachment being free of attachment to the glass pane and the bus band and capable of easy change in dimension in response to external stimuli, in which the terminal has a strap portion attached to said spaced portions and the strap portion has an intermediate part which is offset from the spaced portions, the bus band overlying and extending along a broad surface of the glass pane adjacent an edge thereof, the strap portion overlying the edge of the glass pane, and the spaced portions of the terminal comprise angular elements one arm of each of which overlies the edge of the glass pane and is attached to the respective end of the strap portion, and the other arm of which overlies and is attached to the bus band.

5. A thermal window according to claim 4, in which the glass pane has a recess in a portion of its outline, and the terminal is disposed in said recess.

6. A thermal window according to claim 5, comprising a contact attached to the strap portion of the terminal, and the contact is disposed in said recess.

7. In a thermal window comprising a glass pane and a heating grid therefor, including a bus band fixed to and extending along an edge portion of the glass pane, the improvement comprising, an elongated *terminal* plate having end portions spaced and interconnected by an intermediate portion, *said intermediate portion being offset from said end portions and capable of easy change in dimension in response to external stimuli, at least one of said end portions being spaced from both ends of said bus band,* said end portions only being directly and fixedly attached to said bus band at locations spaced longitudinally therealong *to eliminate destructive strain resulting from external stimuli,* and electrical contact means connected with said intermediate portion.

8. The thermal window of claim 7, said intermediate portion being bowed upwardly out of contact with the underlying bus band.

9. The thermal window of claim 7, said contact means comprising a strap integrally connected at one end with said intermediate portion and extending, first outwardly parallel with the glass pane, across the contiguous edge thereof, then downwardly and transversely across said contiguous edge, to terminate in a contact extending parallel with the contiguous edge of the glass pane.

10. The thermal window of claim 9, said intermediate portion being bowed upwardly out of contact with the underlying bus band.

11. The thermal window of claim 7, each said end portion comprising a first tab and a second tab integral with said first tab and extending downwardly over and transversely across the contiguous edge of the glass pane, said first tabs only being affixed to said bus band at locations spaced therealong, said intermediate portion integrally connecting said second tabs only, and extending longitudinally along and in overlying relation with, the contiguous edge of the glass pane.

12. The thermal window of claim 11, said intermediate portion being bowed outwardly out of contact with and spaced from the underlying edge of the glass pane.

13. The thermal window of claim 12, and a contact band secured to said intermediate portion centrally thereof, and extending generally parallel with the adjacent edge of the glass pane, said second tabs, intermediate portion, and contact band lying within a recess in the contour of the pane's edge.

14. Current lead-in means for a thermal window comprising a glass pane and a heating grid including a bus band secured to the glass pane, said lead-in means comprising, s flat metallic plate having end portions spaced and integrally interconnected by an intermediate portion, said end portions only being directly and fixedly attached to said bus band at areas spaced therealong, and electrical contact means connected with said intermediate portion only.

References Cited

The following references, cited by the Examiner, are of record in the patented file of this patent or the original patent.

UNITED STATES PATENTS

| | | | |
|---|---|---|---|
| 2,787,693 | 4/1957 | Razlag | 339—256 SP |
| 2,795,682 | 6/1957 | Knoll | 219—543 X |
| 2,861,168 | 11/1958 | Knoll | 219—345 X |
| 2,954,454 | 9/1960 | Gaiser | 219—203 |
| 2,965,874 | 12/1960 | Modrey | 339—258 S |
| 2,977,450 | 3/1961 | Boicey | 219—541 |
| 3,379,859 | 4/1968 | Marriott | 219—522 |

VOLODYMYR Y. MAYEWSKY, Primary Examiner

U.S. Cl. X.R.

219—203, 543; 338—309, 316; 339—9 E, 258 S